United States Patent [19]
Fahl et al.

[11] Patent Number: 5,794,734
[45] Date of Patent: Aug. 18, 1998

[54] METHOD AND APPARATUS FOR SUPPLYING DRIVING ENERGY TO VEHICLE SUBASSEMBLIES

[75] Inventors: Ernst-Leo Fahl, Eschweiler, Germany; Albert Haas, Eynatten, Belgium; Franz Koch, Aachen, Germany

[73] Assignee: FEV Motorentechnik GmbH & Co. Kommanditgesellschaft, Aachen, Germany

[21] Appl. No.: 446,846

[22] PCT Filed: Aug. 24, 1994

[86] PCT No.: PCT/EP94/02797

§ 371 Date: Jun. 14, 1995

§ 102(e) Date: Jun. 14, 1995

[87] PCT Pub. No.: WO95/09740

PCT Pub. Date: Apr. 13, 1995

[30] Foreign Application Priority Data

Oct. 1, 1993 [DE] Germany ............... 43 33 564.0

[51] Int. Cl.⁶ ........................................ B60K 25/00
[52] U.S. Cl. ..................... 180/165; 60/418; 180/53.8
[58] Field of Search ......................... 180/165, 53.4, 180/53.8, 306; 280/421; 60/413, 418

[56] References Cited

U.S. PATENT DOCUMENTS

| | | | |
|---|---|---|---|
| 3,700,060 | 10/1972 | Keene et al. | 180/53.4 X |
| 4,534,169 | 8/1985 | Hunt | 180/165 X |
| 4,674,280 | 6/1987 | Stur | 180/165 X |

FOREIGN PATENT DOCUMENTS

| | | |
|---|---|---|
| 0335086 | 10/1989 | European Pat. Off. . |
| 0366080 | 5/1990 | European Pat. Off. . |
| 0366081 | 5/1990 | European Pat. Off. . |
| 0366087 | 5/1990 | European Pat. Off. . |
| 0366088 | 5/1990 | European Pat. Off. . |
| 0366095 | 5/1990 | European Pat. Off. . |
| 0458050 | 11/1991 | European Pat. Off. . |
| 2853906 | 6/1980 | Germany . |
| 3028847 | 3/1982 | Germany . |
| 3235825 | 3/1984 | Germany . |
| 3303881 | 8/1984 | Germany . |
| 8615387 U | 5/1991 | Germany . |

*Primary Examiner*—Eric D. Culbreth
*Assistant Examiner*—Michael Mar
*Attorney, Agent, or Firm*—Spencer & Frank

[57] ABSTRACT

A method of supplying driving energy to subassemblies of a vehicle having an engine, a braking system including a brake pedal, a hydraulic machine, a hydraulic accumulator and a clutch having an engaged state for connecting the engine to the hydraulic machine for driving the hydraulic machine from the engine and a disengaged state for disconnecting the engine from the hydraulic machine. The method includes the following steps: supplying the subassemblies with the required driving energy at least indirectly from the hydraulic accumulator in a disengaged state of the clutch as long as a predetermined sufficient hydraulic pressure prevails in the hydraulic accumulator; driving the hydraulic machine by the engine in an engaged state of the clutch as long as a pressure prevailing in the hydraulic accumulator is less than the predetermined sufficient hydraulic pressure for supplying the subassemblies with the required driving energy at least indirectly from the engine and for simultaneously charging the hydraulic accumulator by the hydraulic machine with hydraulic fluid until the predetermined sufficient hydraulic pressure in the hydraulic accumulator is reached; and for performing the supplying and driving steps, controlling the clutch for selectively placing the clutch into the engaged and disengaged state as a function of the prevailing hydraulic pressure in the hydraulic accumulator and/or the energy requirement of the subassemblies and/or a braking force represented by the position of the brake pedal.

17 Claims, 5 Drawing Sheets

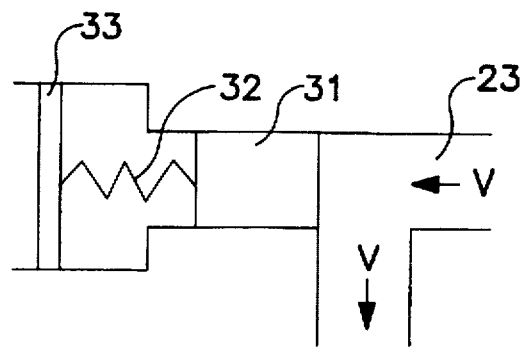
FIG. 5.1
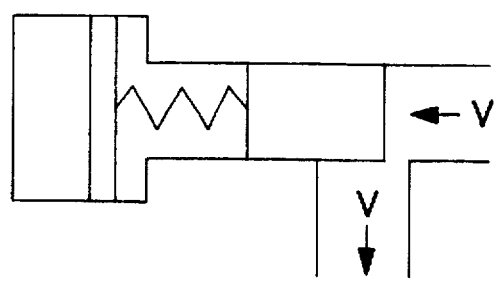
FIG. 5.2
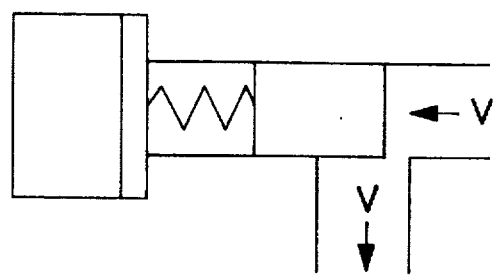
FIG. 5.3

METHOD AND APPARATUS FOR SUPPLYING DRIVING ENERGY TO VEHICLE SUBASSEMBLIES

BACKGROUND OF THE INVENTION

The invention relates to a method and an apparatus for driving subassemblies in a vehicle, particularly a motor vehicle.

Today, vehicles, particularly motor vehicles having an internal combustion engine as the drive, are equipped with a plurality of energy-consuming components, hereinafter referred to broadly as sub-assemblies, for example central locking, power steering, air conditioning, electric window openers, seat heating and the like, which facilitate vehicle operation and increase vehicle safety and comfort. These components are supplied with energy by motor-driven subassemblies, such as a generator, air conditioner compressor, power-steering pump, vacuum pump, etc.

Since, due to high traffic density, motor vehicles are predominantly moved in operation corresponding to city traffic, which is characterized by stopped phases and operating phases, with frequently changing and, to some extent, low speeds, the energy consumption for operation of the subassemblies is noticeable with respect to overall efficiency. For the sake of comfort and safety, it is necessary for a number of assemblies, such as air conditioning and power steering, to be constantly functional. In low useful loads of the vehicle engine, this leads to high energy requirements and prevents the vehicle engine from being able to be shut off during idling phases, or in driving mode, because the energy supply of the subassemblies is effected by the vehicle engine.

SUMMARY OF THE INVENTION

It is an object of the present invention to provide a method and an arrangement for making available at least a portion of the energy necessary for operating the subassemblies by means of recovering the braking energy.

In accordance with the method of the invention, this object is accomplished in such a way that a hydraulic accumulator is charged, by means of a hydraulic machine that is connected to the vehicle engine by way of a switchable clutch and can be operated as a pump, by a hydraulic fluid that can be conveyed in a loop, that the energy requirement for driving the subassemblies is covered directly by the pressure fluid from the hydraulic accumulator and/or the hydraulic machine, and that the clutch is actuated as a function of the charged state of the hydraulic accumulator and/or of the energy requirement of the subassemblies, and/or by way of the brake pedal. In the sense of the invention, hydraulic accumulator is to be understood as, for example, a gas-bubble accumulator having a gas bubble that is under pressure prestress and is disposed in a reservoir container which can be filled with a fluid counter to the pressure of the gas bubble and under its compression.

This method has the advantage that the subassemblies can be driven independently of the vehicle engine when the hydraulic accumulator is charged and the clutch is open, so that in this case only the energy necessary for the respective drive for motion is taken from the vehicle engine without the function of the subassemblies being impaired; it is also possible to shut off the vehicle engine without having to interrupt the operation of the subassemblies. This is significant when, for example, the air conditioner is to continue operating after the vehicle engine has been shut off. The arrangement of the switchable clutch permits charging of the hydraulic accumulator directly by the vehicle engine, independently of the respective operating state, through closing of the clutch and operation of the hydraulic machine as a pump, so that the readiness of the vehicle for operation, including that of the subassemblies necessary for operation, is not disturbed at any time. This can be effected such that the hydraulic accumulator is charged by a partial flow of the fluid and the subassemblies are simultaneously driven by a partial flow of the fluid. When the hydraulic accumulator is charged, the subassemblies can again be operated for a long period of time, independently of the vehicle engine. Whether the hydraulic accumulator is empty or full, direct drive of the subassemblies is possible by way of the vehicle engine. One particular advantage of the method of the invention is, however, essentially that the kinetic energy of the vehicle can be utilized for charging the hydraulic accumulator when the switchable clutch is engaged when the braking process is initiated, so that the braking effect of the vehicle resulting from the energy consumption of the hydraulic machine operating as a pump is further increased; thus, the kinetic energy of the vehicle can be partially stored in the hydraulic accumulator due directly to conversion into pressure. This makes it possible for the necessary braking power for braking a vehicle from 50 km/h to 0 km/h to be converted by charging the empty hydraulic accumulator having a filling volume of, for example, approximately 10 liters and an end pressure in the charged state of, for example, 350 bar. Consequently, in city traffic, which involves low speeds and frequent braking, the hydraulic accumulator is charged repeatedly to the maximum charging pressure; accordingly, less power is taken from the vehicle engine in order to drive the subassemblies. In an advantageous application of the method, the engine start can take place with the aid of the accumulated hydraulic energy, either by way of the hydraulic machine or by way of a hydraulic starting device.

Systems are known in which the vehicle energy is to be recovered during braking via hybrid systems having hydraulic accumulation. Such systems are known from, for example, DE-A-33 03 811, EP-A-0 366 080, EP-A-0 366 081, EP-A-0 366 087, EP-A-0 366 088 and EP-A-0 366 095. However, in all of these publications, an attempt was made to accumulate the braking energy and then feed it into the drive train of the vehicle again as driving power, that is, reuse it directly to generate driving power. To be able to realize this in a practical manner, it is necessary to use relatively large, and subsequently heavy, hydraulic accumulators, which increase the weight of the vehicle and have a negative influence on the overall efficiency of the vehicle.

In an advantageous embodiment of the invention, it is provided that a hydraulic machine is used which can be switched to operate as a pump or as a motor; the energy required for the subassemblies is taken from this machine by mechanical means. With this procedure, it is possible to drive the subassemblies in a conventional manner using belt drives, chain drives or the like, in which instance the hydraulic machine operates as a pump and charges the hydraulic accumulator when the clutch is closed, and when the clutch is open, the hydraulic machine operates as a motor and is supplied with energy from the hydraulic accumulator.

In an advantageous embodiment of the method of the invention, it is provided that a hydraulic machine is used which includes a fixedly predetermined, rpm-proportional output flow. The use according to the invention of such a constant output flow machine has the advantage that it can be controlled, in a simple manner, with respect to rpm during engine operation when the clutch is open. A further advantage is that it is possible to switch from engine operation to pump operation without reversing the direction of rotation.

In another embodiment of the invention, it is provided that a hydraulic machine is used which is configured as a hydraulic pump, preferably a hydraulic pump having an adjustable output flow, hereinafter referred to as constant-quantity control, and that the hydraulic accumulator is charged by way of the hydraulic pump, and/or the subassemblies respectively connected to a hydraulic motor are acted upon by fluid. The advantage offered by this arrangement over the mechanical coupling between the hydraulic machine and subassemblies is that the individual subassemblies are provided with respectively adapted hydraulic motors, so that a control of the individual requirements, or an individual shutdown of subassemblies, is possible by way of the hydraulic connection of the subassemblies. Hence, optimum design rpm is assured for each subassembly. The further advantage is that better utilization of space inside the vehicle is possible, because the individual subassemblies are no longer bound to one belt plane, but can be disposed in free spaces in the engine chamber. Moreover, the arrangement of this additional volume can be undertaken with consideration of its influence on crash safety.

In a further embodiment of the method of the invention, it is provided that the clutch is switched as a function of the charging pressure of the hydraulic accumulator. The advantage of this arrangement is that the readiness for operation of the vehicle is assured. As soon as the charging pressure of the hydraulic accumulator drops below a minimum pressure, that is, the hydraulic accumulator is nearly empty, the hydraulic machine can be actuated as a pump, and the hydraulic accumulator can be recharged, via the clutch when the vehicle engine is running. Because the subassemblies to be driven are in operative connection via the hydraulic machine, the subassemblies are further operated directly due to the operation of the hydraulic machine, regardless of whether the hydraulic machine is operating as a pump or a motor. As soon as the predetermined maximum charging pressure has been reached, the clutch is re-released and the hydraulic machine is switched to motor operation, so that the subassemblies are again driven exclusively by way of the hydraulic machine.

In a particularly advantageous embodiment of the method according to the invention, it is provided that the charging of the hydraulic accumulator is effected with the use of the kinetic energy of the vehicle such that during braking the clutch is closed, the hydraulic machine is switched to pump operation, and the fluid is first conveyed unpressurized in the loop, that the pressure in the fluid loop is increased as a function of the pressure in the brake system and, when the pressure in the brake system is exceeded with respect to the charging pressure of the hydraulic accumulator, the fluid is conveyed into the hydraulic accumulator, and when the maximum charging pressure is reached in the hydraulic accumulator at complete charging, the end charging pressure is maintained in the fluid loop during further braking with a further increase in the pressure in the brake system, and is decreased independently of the charging pressure when the pressure in the brake system decreases. This procedure has the advantage that, during initiation of the braking process, the energy removal for charging the hydraulic accumulator takes place "gently," so no jerky or stepwise increase in the braking force occurs due to the braking process, including the vehicle engine braking torque which become effective during this process. The so-called braking comfort is maintained; the delay introduced by the brake is also not affected detrimentally when the hydraulic accumulator is completely charged, because the power consumption of the hydraulic machine connected as a pump, which is predetermined by the maximum charging pressure, remains as long as the corresponding pressure is maintained in the braking system, that is, the brake pedal is pressed. If the braking process requires higher brake pressure, this is applied by means of an increase in the pedal force (actuation of the vehicle operating brake), but the braking torque of the hydraulic machine, which supports the vehicle engine braking torque, is maintained. If the pedal force is reduced again, the pressure in the fluid loop of the hydraulic machine and the pressure in the brake system decrease proportionally, so that no erratic change in the removal of kinetic energy is caused by the vehicle brakes (conversion to heat) and the hydraulic machines. If the brake is vented, that is, the brake pedal is released, the clutch opens, so that the additional braking torque of the hydraulic machine ceases. Because the fluid is heated in this procedure, i.e., in conveyance of the fluid in the loop with the maintenance of a predetermined pump pressure, that is, no kinetic vehicle energy is converted into heat, the fluid must likewise be cooled. It is particularly advisable for those regions to be cooled in which a significant portion of the flow energy is converted into thermal energy due to the throttling on the pressure side of the pump. However, because the energy contained in the hydraulic accumulator is continuously consumed in order to drive the subassemblies, practically every braking process first leads to charging, so that, in a normal case, only short-time peak loads lead to more intense heating of the fluid, which must be dissipated through intensive cooling.

For performing the method of the invention, an arrangement for driving subassemblies, particularly those of motor vehicles, is provided in accordance with the invention; this arrangement includes a hydraulic machine which is connected to the vehicle engine by way of a clutch and is in operative connection with an equalizing reservoir on the one hand and the subassemblies to be driven on the other. A control arrangement is provided which actuates at least the clutch as a function of the charged state of the hydraulic accumulator and/or the energy requirement of the subassemblies, and/or by way of the brake pedal. With this type of arrangement, it is possible to charge the hydraulic accumulator, after starting the vehicle engine, by actuating the hydraulic machine, which can also take place during driving operation. As soon as the hydraulic accumulator is charged, the clutch is automatically released, so the energy necessary for operation of the subassemblies can be removed from the hydraulic accumulator. The control arrangement causes the clutch to be re-closed during each braking process, and at least a portion of the kinetic energy of the vehicle for braking to be consumed by the hydraulic machine and used to charge the hydraulic accumulator. The control arrangement further ensures that, during lengthy drives without braking, depending on the charged state of the hydraulic accumulator, the clutch is closed and, during driving operation or in the state in which the vehicle engine is running, the hydraulic machine performs charging work directly by way of the vehicle engine.

In a first embodiment of the arrangement according to the invention, it is provided that the hydraulic machine is configured to be switched to operate as a pump and as a motor, and is in operative connection with the subassemblies. Belt drives, for example, are considered here as mechanical driving means; in this instance, the subassemblies are preferably to be disposed in a belt plane with the hydraulic machine, and the hydraulic machine always serves as a drive for the subassemblies, and energy supply is only effected either by way of the vehicle engine when the clutch is closed, if the hydraulic accumulator is charged at the same time during pump operation, or by way of the hydraulic accumulator when the hydraulic machine operates as a motor when the clutch is open. In this instance, it is advisable for the hydraulic machine to be configured as a constant output flow machine having an rpm-proportional output flow.

In another embodiment of the arrangement according to the invention, it is provided that the hydraulic machine is designed as a hydraulic pump, preferably a hydraulic pump that has constant-quantity control, and that the subassemblies are respectively provided with a hydraulic drive and are connected to the hydraulic machine and the hydraulic accumulator by way of fluid lines. An advantage of this arrangement is that only the hydraulic machine is mechanically coupled to the vehicle engine by way of the clutch, and therefore must be disposed in the engine chamber in a defined allocation to the vehicle engine. All of the other assemblies, that is, the hydraulic accumulator and the subassemblies to be driven, can be disposed in an optimum grouping in free spaces present in the engine chamber, because only the fluid lines are necessary for connection. A further advantage of this arrangement is that the hydraulic drives of the individual subassemblies can be designed optimally for the power takeup of the subassembly, so that only the respectively necessary power is always taken. A further advantage of this arrangement is that the subassemblies are actuated and shut off independently of one another, and/or can be controlled with respect to power removal. It is useful when the hydraulic pump, the hydraulic accumulator and the hydraulic drives of the subassemblies are connected to one another by way of a control block that can be actuated by the control arrangement, and by way of which the fluid flow of the hydraulic pump to the hydraulic accumulator and/or the hydraulic drives is divided.

In an embodiment of this arrangement, it is provided that the hydraulic drives of the subassemblies are at least partly connected in parallel with respect to the fluid flow. It is useful when actuatable control valves for the individual hydraulic drives are disposed in the supply lines. The control valve can be configured as simple switching valves which open or close the supply lines for the fluid flow. However, it is also possible to design the control valves such that they regulate the mass flow.

In another embodiment of the arrangement according to the invention, it is provided that the hydraulic drives are at least partly connected in series with respect to the fluid flow, and that a bypass line provided with an actuatable control valve is associated with each of the hydraulic drives.

According to the invention, an arrangement for driving subassemblies of a motor vehicle is provided for performing the method of the invention; this arrangement includes a hydraulic machine which is connected to the vehicle engine by way of a switchable clutch and is in operative connection with the subassemblies, and is connected on the one hand to an equalizing reservoir and to a hydraulic accumulator on the other via an output conduit, in which a first check valve is disposed between the equalizing reservoir and the hydraulic machine, and a second check valve is disposed between the hydraulic accumulator and the hydraulic machine, with a first bypass line that bypasses the hydraulic machine being disposed between the two check valves and having a controllable pressure-regulating valve, and a second bypass line being associated with the output conduit and bypassing the second check valve and the hydraulic machine and being provided with a switchable stop valve, and with a third bypass line being associated with the output conduit that bypasses the first check valve and the hydraulic machine and is provided with a switchable stop valve. This type of arrangement permits the hydraulic machine to be switched from pump operation to motor operation and vice versa without a change in the direction of rotation. With the arrangement of a controllable pressure-regulating valve or throttling valve, the consumption or release of energy from the hydraulic machine can be directly influenced. Thus, it is possible, for example, to mechanically drive the subassemblies to be driven by way of the interposed hydraulic machine when the clutch is closed and the pressure-regulating valve is open and unpressurized, because in this case the fluid is conveyed without pressure through the output conduit and the bypass line in the loop. In a corresponding actuation of the stop valves in the bypass lines (all stop valves closed), it is possible to charge the hydraulic accumulator with the aid of the vehicle engine, that is, also in the stationary state. This process can also take place during driving, so that the subassemblies are also driven when the hydraulic accumulator, having been emptied, can be recharged during driving. In a corresponding actuation of the clutch by way of the brake pedal, the kinetic energy of the vehicle can be used to charge the hydraulic accumulator corresponding to the above-described method. In an advantageous embodiment, it is further provided that, at least in the first bypass line, at least one cooler is provided for the fluid so that the portion of energy that cannot be used by the fluid loop is released as heat via the cooler during the consumption of kinetic energy.

While it is basically possible to adapt the pressure-regulating valve or throttle valve to the individual operating conditions by means of a corresponding mechanical, electrical or electronic actuation, in a particularly advantageous embodiment it is provided that, on the drive side, the pressure-regulating valve is connected to a pressure line of the hydraulic brake system of the motor vehicle. This makes it possible to adapt the pressure in the fluid loop to the pressure in the brake system using a component which is mechanically relatively simple in design. This makes it possible, in a pressure-regulating valve operating with a control plunger, to displace the control plunger with adaptation to the respective pressure in the hydraulic brake system, so that, when the clutch and the magnet valves in the bypass lines are closed, the hydraulic machine is driven by the motor operating in driving mode, and the braking torque of the vehicle engine thus increases corresponding to the conveying power required by the hydraulic machine to fill the hydraulic accumulator, so that the kinetic energy can be at least partly stored in the hydraulic accumulator. It is particularly useful when the pressure-regulating valve does not completely close the flow-through of the first bypass line on the control side, so that the hydraulic machine operating as a pump recirculates the fluid through the first bypass line and the output conduit in the loop at a predetermined maximum pressure which corresponds to the maximum charging pressure of the hydraulic accumulator, so that, even when the hydraulic accumulator is completely filled, a conveying power corresponding to the maximum charging pressure of the hydraulic accumulator is taken up as braking torque and dissipated as heat.

BRIEF DESCRIPTION OF THE DRAWINGS

The invention is described in detail in conjunction with schematic drawings of an embodiment. Shown are in.

DESCRIPTION OF THE PREFERRED EMBODIMENT

Figure 1:
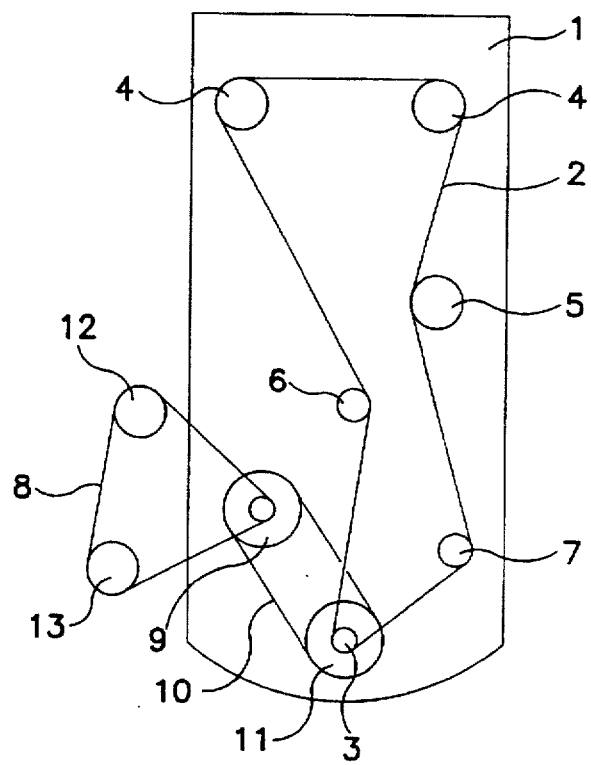
FIG. 1 a front view of a vehicle engine having subassemblies to be driven mechanically.

The two drive regions for the primary and subassemblies are represented in a schematic front view of an engine 1 in FIG. 1. The first drive region is formed by a belt drive or a chain 2, which is guided as a drive via the crankshaft 3, and drives, as primary assemblies, the camshafts 4, the injection pump 5, the water pump 6 and the oil pump 7 in a conventional manner.

The second drive region is formed by, for example, a belt drive 8, which is guided via a hydraulic machine 9 that can be switched to operate either as a pump or a motor. The option of this type of switching operation, in which the direction of rotation is maintained, is explained in detail for an embodiment in conjunction with FIG. 3. The hydraulic machine 9 is likewise driven by the crankshaft by way of a belt drive 10 and an interposed clutch 11. When the clutch 11 is open, the drive connection between the hydraulic machine 9 and the crankshaft is released. When the clutch 11 is closed, the hydraulic machine 9 can be driven by the engine by way of the crankshaft.

The second, mechanical drive region of the belt drive 8 drives, for example, an air conditioner compressor 12 and a generator 13 as subassemblies. In addition, further subassemblies, such as a vacuum pump, the pressure supply for level regulation and similar assemblies can be driven. The drive of the subassemblies of the second drive region is effected either by way of the hydraulic machine switched to motor operation or, when the clutch is closed, directly by the crankshaft 3 by way of the hydraulic machine switched as a pump.

Figure 2:
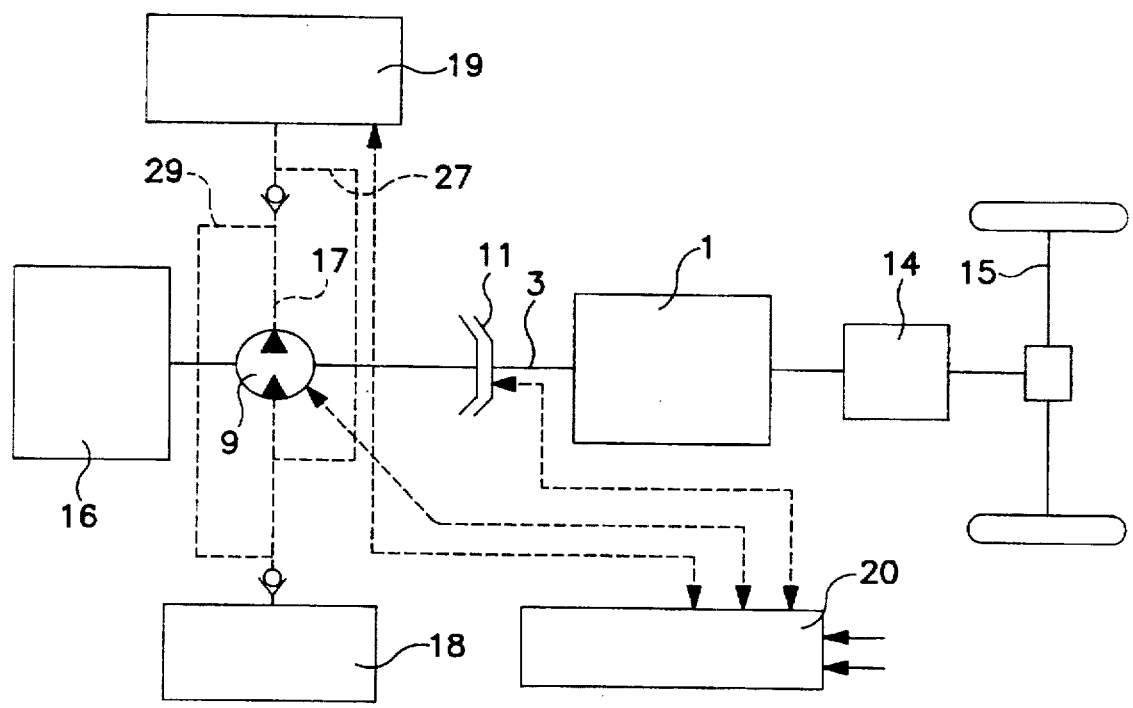
FIG. 2 a general outlay for mechanically drivable subassemblies in a block diagram, FIG. 3 a block diagram of the fluid system, FIG. 4 a block diagram of a pressure-regulating valve, FIGS. 5.1, 5.2 and 5.3 the pressure-regulating valve in different switching states, FIG. 6 a general outlay for hydraulically drivable subassemblies in a block diagram, FIG. 7 a general outlay modified with respect to FIG. 6.

FIG. 2 likewise represents the drive of a motor vehicle in the form of a block diagram. In this instance, the motor 1 conventionally drives a driving axle 15 via a gear 14. The free end of the crankshaft 3 is connected to the switchable clutch 11, by way of which the hydraulic machine 9 can be brought into operative connection with the vehicle engine. In the way described in conjunction with FIG. 1, a number of subassemblies is driven by way of the hydraulic machine 9, as illustrated in this representation as a subassembly block 16.

In an automatic gear having a flow transducer, it is useful, for example, when the above-described clutch is disposed between the flow transducer and the drive axle 15 so that the best possible transmission of the braking torque of the hydraulic machine to the vehicle is effected in driving mode.

The hydraulic machine 9 is connected on the one hand to an equalizing reservoir 18 via an output conduit 17, and on the other hand to a hydraulic accumulator 19. The hydraulic accumulator 19 is preferably configured as a gas-bubble accumulator having a holding capacity of, for example, 10 liters, and whose gas bubble is prestressed such that a maximum charging pressure of, for example, 350 bar can be achieved. The hydraulic machine 19 is preferably configured as a so-called constant output flow machine, i.e., the output flow is rpm-proportional.

Figure 3:
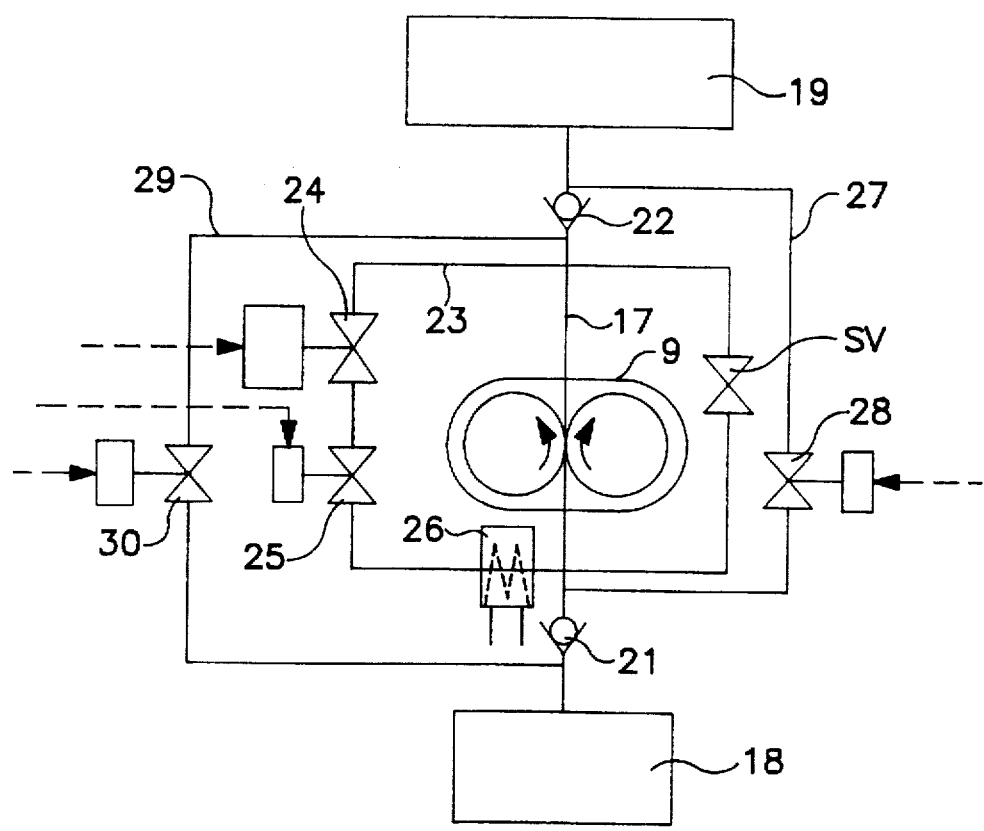

With a system of bypass lines only indicated here and explained in detail in conjunction with FIG. 3, it is possible to operate the hydraulic machine 9 as a pump via the drive train of the engine when the clutch 11 is closed, and to pump the fluid from, for example, the equalizing reservoir 18 and into the hydraulic accumulator 19, filling it.

When the clutch 11 is open and the bypass lines are correspondingly switched, it is possible to drive the subassembly block 16 by way of the hydraulic machine 9 now switched as a motor, independently of the internal combustion engine, using the pressure energy contained in the hydraulic accumulator.

With a control 20 only indicated schematically here, the measuring and function signals are processed, and the individual control and regulation signals are emitted. Examples are the signal for opening and closing the clutch 11, the signals for operating the individual valves included in the fluid system, and the control signals emitted during operation of the brake pedal. Moreover, the pressure in the hydraulic accumulator is detected. Further regulation and control signals for the entire system can likewise be acquired and processed in the control 20.

As can be seen from FIG. 3, a check valve 21 is disposed in the output conduit 17, in the region of the equalizing reservoir 18, and a check valve 22 is disposed in the region of the hydraulic accumulator 19. A first bypass line 23, which bypasses the hydraulic machine and in which a controllable pressure-regulating valve 24 and a magnet valve 25 are disposed, is provided between the two check valves 21 and 22. Further provided in the first bypass line 23 are a cooler 26 for cooling the fluid and a safety valve SV. When the magnet valve 25 is closed, the hydraulic accumulator 19 can be filled by the driven hydraulic machine 9. If the magnet valve is then opened and the pressure-regulating valve 24 is set to be unpressurized, the fluid can be conveyed through the output conduit 17 and the first bypass line 23 in the loop by means of the hydraulic machine 19 operating as a pump. The pressure of the hydraulic accumulator 19 keeps the check valve 22 closed, while the check valve 21 at the equalizing reservoir remains closed due to the fluid pressure, however low, in the loop.

The output conduit 17 is allocated a second bypass line 27, which bypasses the second check valve 22 and the hydraulic machine 9, and in which a further magnet valve 28 is disposed. A third bypass line 29 bypasses the first check valve 21 and the hydraulic machine 9. A magnet valve 30 is also disposed in the third bypass line 29. If the magnet valve 25 in the first bypass line 23 is now closed, and the magnet valves 28 and 30 are opened when the hydraulic accumulator 19 is filled, the fluid is conveyed out of the hydraulic accumulator 19, via the second bypass line 27, the output conduit 17 and the third bypass line 29, through the hydraulic machine 9 and into the equalizing reservoir 18. When switched in this manner, the hydraulic machine 9 operates as a motor. The advantage of this arrangement is that the hydraulic machine 9 maintains its direction of rotation, both in pump operation and motor operation.

Different operating modes are now possible with the system described in conjunction with FIGS. 2 and 3. In a first operating mode, when the clutch 11 is closed and the pressure-regulating valve 24 and the magnet valve 25 are open, the subassembly block 16 can be driven in a conventional manner, mechanically by way of the engine. In this instance, the hydraulic machine 9 circulates the fluid unpressurized. This type of operation can be necessary when, for example, the hydraulic accumulator is empty or is defective, or when full power is required of the internal combustion engine, for example during acceleration or during full-load operation.

A further operating mode is used when the accumulator is to be charged by way of the vehicle engine. In this case, the clutch 11 is closed, and the magnet valves 25, 28 and 30 are likewise closed. The hydraulic machine 9 is driven as a pump by the engine, so that the fluid is conveyed into the hydraulic accumulator 19 via the output conduit 19 until the hydraulic accumulator 19 is charged. At the same time, the subassembly block 16 is driven mechanically by the engine. As soon as the hydraulic accumulator 19 is filled, that is, the maximum charging pressure has been reached, the magnet valve 25 is opened by way of a pressure signal, so that, when the pressure-regulating valve 24 is likewise open, the fluid is again conveyed unpressurized in the loop. If the clutch 11 is now opened, the hydraulic machine 9 can be driven in motor operation by way of a corresponding actuation of the magnet valves 28 and 30 via the bypass line 27 and 29, so that the subassembly block 16 is no longer driven by the vehicle engine 1, but by the hydraulic machine 9. Regulation of rpm for the subassemblies is possible, for example, with cyclical operation of one of the magnet valves 28 or 30. It is also possible to start the vehicle engine 1 with the aid of the hydraulic machine in this operating position. For this purpose, the clutch 11 is closed, and the magnet valves 28 and 30 are opened, so the internal combustion engine can be started by way of the hydraulic machine 9.

Although the above operating modes include the process of charging the hydraulic accumulator 19, they do not number among the standard modes of operation. The arrangement is such that the kinetic energy of the vehicle is used in the braking process during driving operation. The control 20 obtains corresponding control signals by way of the brake pedal. When the braking process is initiated, at the same time as the brake light is switched, the clutch 11 is closed, as are magnet valves 28 and 30, so that the hydraulic machine 9 operates as a pump and conveys the fluid counter to the system pressure predetermined by the hydraulic accumulator 19. As long as the pressure in the hydraulic accumulator is greater than the system pressure exerted by the hydraulic accumulator 19, the output flow in the loop is gradually shut off with adaptation to the pressure in the brake system, as explained in detail below, via the pressure-regulating valve 24 when the magnet valve 25 is open, so that the braking torque applied by the hydraulic machine 9 being operated as a pump remains effective. As soon as the conveying pressure of the hydraulic machine exceeds the pressure in the hydraulic accumulator 19, fluid can be conveyed into the hydraulic accumulator. If the braking process is then sustained, or a new braking process is effected, when the hydraulic accumulator 19 is completely closed, the conveying pressure exerted by the hydraulic machine 9 is again shut off by the pressure-regulating valve 24 as a function of the pressure in the brake system, as described above. The resulting heat is carried away from the fluid via the cooler 26. As soon as the braking process has ended, that is, the brake pedal has been released, a corresponding signal is sent to the control 20, by means of which the clutch 11 and the magnet valves 28 and 30 are opened and the magnet valve 25 is closed, and the hydraulic machine operates in motor operation while maintaining the direction of rotation, and drives the subassembly block 16.

The pressure-regulating valve is now coupled to the hydraulic brake system via a pressure transmitter such that a pressure-proportional actuation of the pressure-regulating valve 24 that is matched to the pressure in the brake system is effected when the brake pedal is operated. This actuation can be effected with corresponding control drives, by way of the control 20, on the basis of pressure sensors in the brake system and in the fluid system of the hydraulic machine 9.

Figure 4:
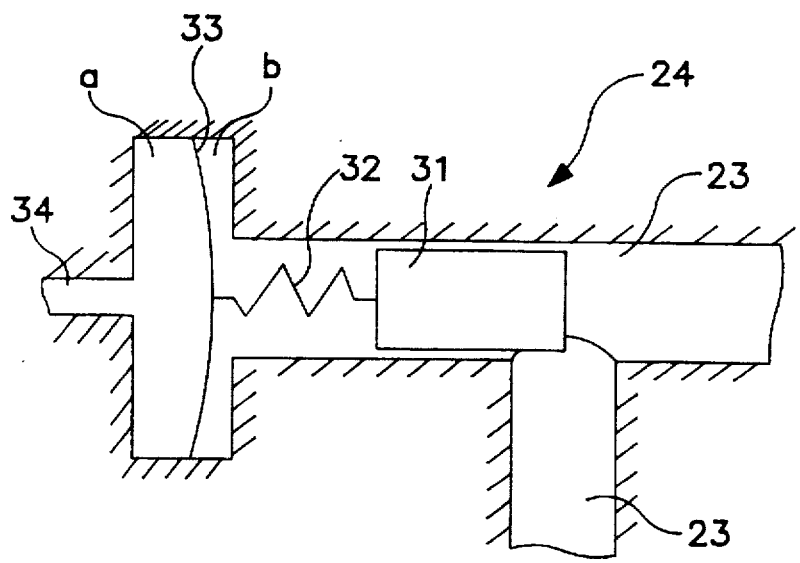

A simple arrangement for the pressure-regulating valve that can be realized mechanically, and a mechanical actuation of the pressure-regulating valve as a function of the pressure in the brake system, are illustrated in a schematic drawing in FIG. 4. The mechanical embodiment of the pressure-regulating valve 24 essentially comprises a control plunger 31, which can open the flow-through cross-section of the bypass line 23—starting from a minimum flow-through opening—up to complete release, that is, the unpressurized flow-through of the fluid. The control plunger 31 is supported against a pressure diaphragm 33 by a supporting spring 32. The pressure diaphragm 33 is connected to the hydraulic brake system via a pipeline 34, so that side a is acted upon by the respective pressure of the brake system, while side b is acted upon by the pressure of the hydraulic machine loop via the control plunger 31 and its supporting spring 32. Corresponding to the given surface ratios of the control plunger 31, which has a smaller surface than the large surface of the diaphragm 33, the different pressures in the brake system, which can be in a range of a maximum of 30 bar, are adapted to the pressure in the hydraulic machine loop, which can be a maximum of 350 bar.

The function of a pressure-regulating valve that operates according to this principle is illustrated by FIGS. 5.1, 5.2 and 5.3. FIG. 5.1 shows the position of the control plunger 31 in the normal position, when the pressure-regulating valve is completely open. If the braking process is now initiated, that is, the contact switch for brake light and the corresponding contact switch for actuating the control 20 are turned on without the braking effect, the system is activated to brake, i.e., the magnet valves 28 and 30 are closed, while the magnet valve 25 is opened. Moreover, the clutch 11 is closed, so that the hydraulic machine 9 conveys without pressure. As soon as the pedal path is greater than the pedal path that causes the contact switches to be operated, that is, a pressure is already building in the brake system, the control plunger 31 is displaced, proportionally to the pressure in the brake system, by the diaphragm 33, so that the pressure-regulating valve closes as a function of the pressure in the brake system. Depending on the brake system pressure, different operating states are established at the control plunger 31 due to the force equilibrium. If the pressure in the hydraulic accumulator 19 has dropped nearly completely, i.e., the hydraulic accumulator is almost empty, the hydraulic accumulator is filled corresponding to this pressure condition. If this brake pressure is maintained, and the hydraulic accumulator is filled to the point that the counterpressure of the hydraulic accumulator corresponds to the conveying pressure of the hydraulic machine 9, the fluid is conveyed in the loop, as described above, for the remainder of the braking time, so that the corresponding portion of energy is converted into heat by means of throttling by the pressure-regulating valve, and dissipated via the cooler 26.

Because the gas pedal is released during this process, that is, the vehicle is in driving mode, the driving torque taken up from the hydraulic machine 9 acts as an additional braking torque on the vehicle by way of the engine. The kinetic energy is thus first used to fill the hydraulic accumulator 19 and subsequently converted into heat. This process can already be in effect before the brakes have a perceptible effect on the wheel.

If the brake must be fully depressed because of traffic conditions, the situation illustrated in FIG. 5.3 is established.

The pressure in the brake system is greater than the maximum possible conveying pressure of the hydraulic machine 9, corresponding to the proportionality by means of the conversion in the pressure-regulating valve. The maximum possible pressure exerted by the pressure-regulating valve in its end position is maintained by the position of the control plunger 31, so that the additional braking torque of the hydraulic machine continues to be present. The braking energy that is further necessary then becomes directly effective on the vehicle wheels due to the operation of the vehicle brake.

As soon as the brake pedal is released, the magnet valve 25 closes and the magnet valves 28 and 30 open, so that the hydraulic accumulator 19 acts upon the hydraulic machine 9 when the clutch 11 is open, and the hydraulic machine 9 can drive the subassembly block 16 as a motor.

Figure 6:
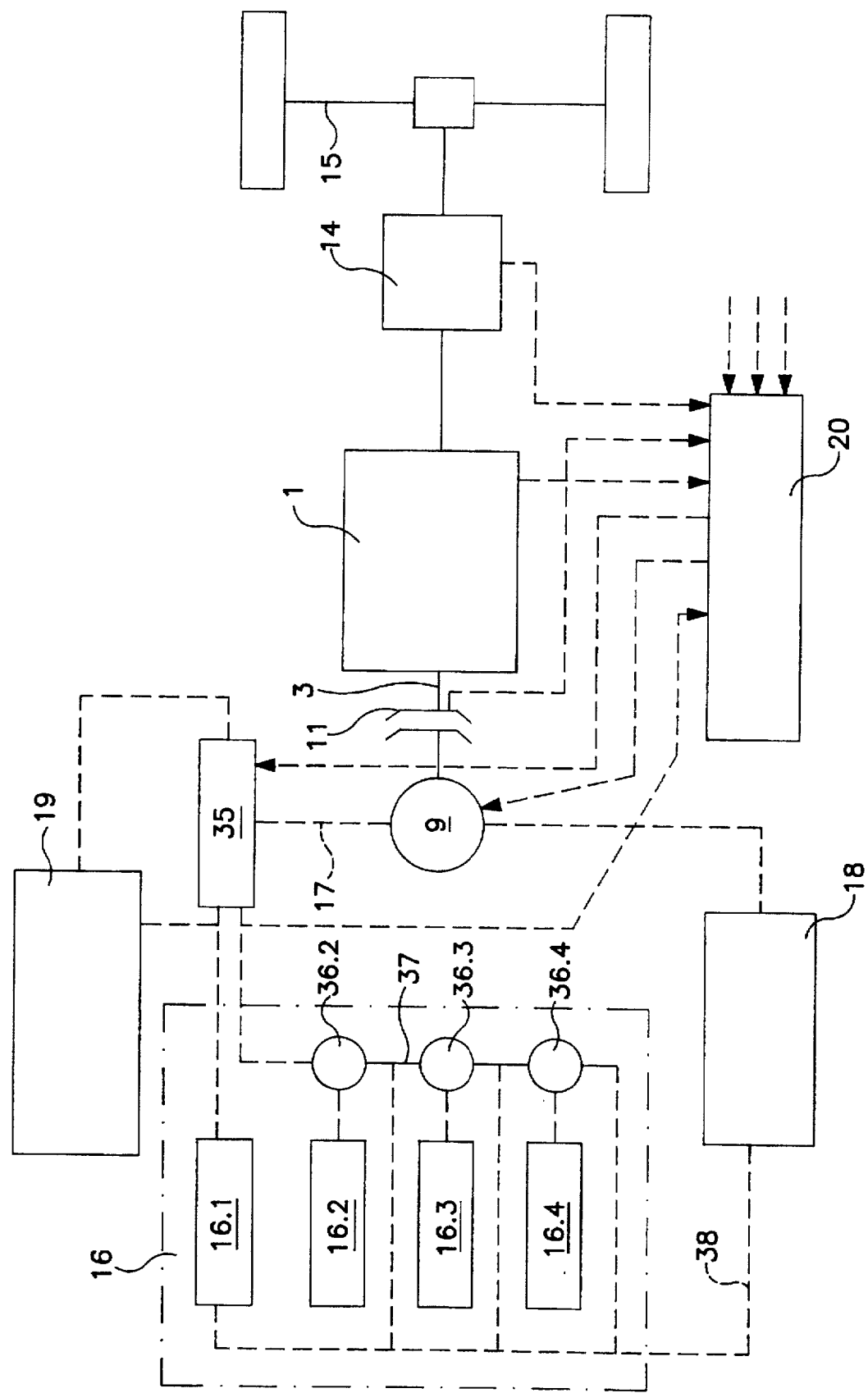
Figure 7:
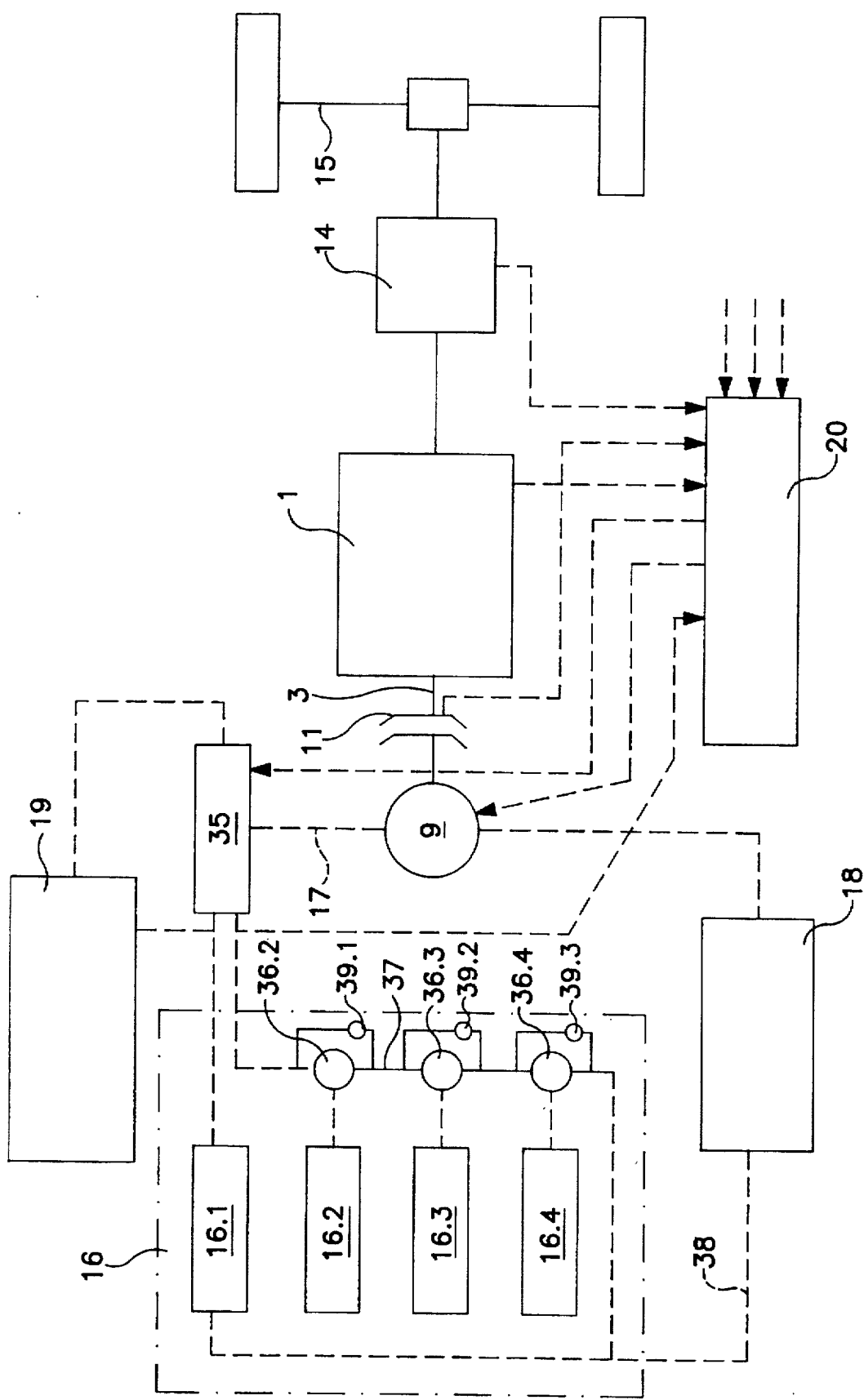

While an embodiment of the arrangement that shows a mechanical operative connection between the hydraulic machine and the subassemblies to be driven was illustrated and described in conjunction with FIGS. 1 through 5, the block diagrams according to FIGS. 6 and 7 show arrangements in which only the hydraulic machine is still in mechanical operation connection with the vehicle engine 1, whereas the subassemblies are hydraulically coupled with the hydraulic machine. As described in conjunction with the block diagram according to FIG. 2, in the arrangement according to FIG. 6, the vehicle engine 1 of the motor vehicle is again connected to the drive axle via a gear 14. The free end of the crankshaft 3 is connected to the switchable clutch 11, by way of which the hydraulic machine 9 can be brought into operative connection with the vehicle engine. In this embodiment of the arrangement, the hydraulic machine 9 is configured as a hydraulic pump, preferably as a hydraulic pump having constant-quantity regulation and being connected on the suction side to the equalizing reservoir 18. A control block 35, by means of which the pressure fluid can be supplied alternatingly to the hydraulic accumulator 19 and/or the subassembly block 16, is disposed in the pressure-side output conduit 17. The control block 35 is connected to the control 20.

The "subassembly block" 16 includes as subassemblies, for example, the power-steering pump 16.1 of the power steering, an air conditioner compressor 16.2, a generator 16.3 and, corresponding to the need for subassemblies, one or more subassemblies 16.4.

The air conditioner compressor 16.2, the generator 16.3 and the further subassembly 16.4 are respectively connected to their own hydraulic motor 36.2, 36.3 and 36.4 as vehicle engines, with the hydraulic motors 36 being connected in series with the control block 35 via the line 37, and with the equalizing reservoir via the discharge line 38. In this instance, the hydraulic motors 36 are designed to correspond to the requirements of the relevant subassembly.

The data necessary for the actuation of the individual systems are acquired in the control 20, for example, the gear signal by means of a corresponding indicator on the gear 14, the rpm of the engine 1, the pressure of the hydraulic accumulator 10 and the position of the gas pedal and brake pedal, and the indications of the subassembly requirements. Based on these data, the clutch 19, the control block 35 and the hydraulic machine 9 are actuated, with respect to the conveyed quantity, by a corresponding electronic circuit. For example, when the brake pedal is operated and a pressure in the hydraulic accumulator 19 is less than the maximum pressure, the clutch 11 is operated and the control block 35 is actuated such that, when the subassemblies 16 that have just started to operate are further acted upon, the hydraulic accumulator is charged. If the brake pedal is re-released, the clutch 11 opens and the control block 35 is actuated by the control 20 such that the subassemblies 16 are supplied with energy by the hydraulic accumulator 19.

The block diagram according to FIG. 7 shows a modification of the arrangement according to FIG. 6. The basic design corresponds to the design of FIG. 6. The only difference is that the individual drives 36.2 through 36.4 are connected in series, with each drive of a subassembly being able to be bypassed by a bypass line, in which a reverse valve 39.1, 39.2 or 39.3, respectively, is disposed and can be actuated by the control 20, so that, depending on the requirements, the individual subassemblies 16.1 through 16.3 can be switched on and off.

What is claimed is:

1. A method of supplying driving energy required to operate subassemblies of a vehicle, the vehicle having an engine and a braking system including a brake pedal, comprising the following steps:

(a) providing a hydraulic machine, a hydraulic accumulator and a clutch having an engaged state for connecting the engine to the hydraulic machine for driving the hydraulic machine from the engine and a disengaged state for disconnecting the engine from the hydraulic machine;

(b) supplying the subassemblies with the required driving energy at least indirectly from the hydraulic accumulator in a disengaged state of said clutch as long as a predetermined sufficient hydraulic pressure prevails in the hydraulic accumulator;

(c) driving said hydraulic machine by said engine in an engaged state of said clutch as long as a pressure prevailing in the hydraulic accumulator is less than said predetermined sufficient hydraulic pressure for supplying the subassemblies with the required driving energy at least indirectly from the engine and for simultaneously charging the hydraulic accumulator by the hydraulic machine with hydraulic fluid until the predetermined sufficient hydraulic pressure in the hydraulic accumulator is reached; and (d) for performing steps (b) and (c), controlling the clutch for selectively placing the clutch into the engaged and disengaged state as a function of the prevailing hydraulic pressure in said hydraulic accumulator, the energy requirement of the subassemblies and a braking force represented by the position of the brake pedal.

2. The method as defined in claim 1, further comprising the step of cooling said hydraulic fluid.

3. The method as defined in claim 1, further comprising the steps of (e) placing said clutch in said engaged state during application of a braking force by said brake pedal;

(f) driving said hydraulic fluid in a circular flow by said hydraulic machine;

(g) increasing the pressure in the circulating hydraulic fluid as a function of a braking pressure representing the braking force in the braking system;

(h) supplying hydraulic fluid from the circular flow to said hydraulic accumulator when said braking pressure exceeds a charging pressure in said hydraulic accumulator;

(i) upon reaching a maximum charging pressure of said hydraulic accumulator, maintaining the maximum charging pressure in said circular flow if the braking pressure further increases due to a continued application of the braking force; and (j) upon a drop in the braking pressure lowering the charging pressure independently of the maximum charging pressure.

4. A vehicle comprising (a) an engine;

(b) a braking system, including a brake pedal, for applying a braking force;

(c) a plurality of subassemblies each requiring driving energy;

(d) a hydraulic machine;

(e) a hydraulic accumulator;

(f) a hydraulic line maintaining a hydraulic connection between said hydraulic machine and said hydraulic accumulator for charging said hydraulic accumulator with hydraulic fluid to a predetermined accumulator pressure and for driving said hydraulic machine from said hydraulic accumulator;

(g) a clutch having an engaged state for drivingly connecting the engine to the hydraulic machine for driving the hydraulic machine from the engine and a disengaged state for disconnecting the engine from the hydraulic machine;

(h) energy transmitting means for supplying the required driving energy to said subassemblies from at least one of said engine, said hydraulic machine and said hydraulic accumulator; and (i) regulating means for selectively placing the clutch into the engaged and disengaged state as a function of a prevailing hydraulic pressure in said hydraulic accumulator, the energy requirement of the subassemblies and the braking force represented by a position of the brake pedal; said regulating means including (1) means for placing said clutch into said disengaged state for supplying the subassemblies with the required driving energy at least indirectly from the hydraulic accumulator as long as a predetermined sufficient hydraulic pressure prevails in the hydraulic accumulator; and (2) means for placing said clutch into said engaged state for effecting a driving of said hydraulic machine by said engine as long as a pressure prevailing in the hydraulic accumulator is less than said predetermined sufficient hydraulic pressure for supplying the subassemblies with the required driving energy at least indirectly from the engine and for simultaneously charging the hydraulic accumulator by the hydraulic machine with hydraulic fluid until the predetermined sufficient hydraulic pressure in the hydraulic accumulator is reached.

5. The vehicle as defined in claim 4, wherein said energy transmitting means comprises a mechanical coupling between said hydraulic machine and said subassemblies.

6. The vehicle as defined in claim 4, wherein said hydraulic machine is a constant delivery machine having an rpm-proportional output flow.

7. The vehicle as defined in claim 4, further wherein each subassembly has a hydraulic drive; said energy transmitting means including a hydraulic circuit coupling an output of said hydraulic machine and an output of said hydraulic accumulator to an input of said hydraulic drives for supplying a driving energy to said subassemblies from at least one of said hydraulic accumulator and said hydraulic machine by hydraulic fluid flowing in said hydraulic circuit.

8. The vehicle as defined in claim 7, further comprising a control block; said control block being disposed in said hydraulic circuit and being connected to said regulating means for dividing hydraulic flow from said hydraulic machine between said hydraulic accumulator and said hydraulic drives of said subassemblies.

9. The vehicle as defined in claim 7, wherein said hydraulic drives are, at least in part, connected parallel with respect to the hydraulic flow.

10. The vehicle as defined in claim 7, wherein said hydraulic circuit has individual hydraulic lines connected to said hydraulic drives of said subassemblies; further comprising separately controllable setting valves situated in said individual hydraulic lines for individually controlling the hydraulic drives of said subassemblies.

11. The vehicle as defined in claim 7, wherein said hydraulic drives are, at least in part, connected in series with respect to the hydraulic flow; further comprising separate bypass conduits bypassing separately said hydraulic drives; and a controllable setting valve positioned in each said bypass conduit.

12. The vehicle as defined in claim 4, further comprising (j) an equalizing reservoir; said hydraulic line connecting said hydraulic machine with said equalizing reservoir;

(k) a first check valve positioned in said hydraulic line between said hydraulic machine and said equalizing reservoir;

(l) a second check valve positioned in said hydraulic line between said hydraulic machine and said hydraulic accumulator;

(m) a first bypass conduit connected to said hydraulic line between said second check valve and said hydraulic machine and between said first check valve and said hydraulic machine for bridging said hydraulic machine;

(n) a controllable pressure-regulating valve positioned in said first bypass conduit;

(o) a second bypass conduit connected to said hydraulic line between said second check valve and said hydraulic accumulator and between said first check valve and said hydraulic machine for bridging said second check valve and said hydraulic machine;

(p) a first switchable stop valve positioned in said second bypass conduit;

(q) a third bypass conduit connected to said hydraulic line between said second check valve and said hydraulic machine and between said first check valve and said equalizing reservoir for bridging said first check valve and said hydraulic machine; and (r) a second switchable stop valve positioned in said third bypass conduit.

13. The vehicle as defined in claim 12, further comprising a cooler positioned in said first bypass conduit for cooling the hydraulic medium therein.

14. The vehicle as defined in claim 12, wherein said braking system is a hydraulic braking system; further comprising a hydraulic pressure conduit coupling an output of said hydraulic braking system with said controllable pressure-regulating valve for controlling said pressure-regulating valve as a function of a pressure in said hydraulic braking system.

15. The vehicle as defined in claim 12, wherein said braking system has an actuating device connected to said controllable pressure-regulating valve for controlling said pressure-regulating valve.

16. The vehicle as defined in claim 12, wherein said pressure-regulating valve has a control plunger for regulating a flow passage of said first bypass conduit between a maximum flow passage and a minimum flow passage; said minimum flow passage being greater than zero; further comprising a third switchable stop valve positioned in said first bypass conduit.

17. A vehicle comprising
    (a) an engine;
    (b) a braking system, including a brake pedal, for applying a braking force;
    (c) a plurality of subassemblies each requiring driving energy;
    (d) a hydraulic machine;
    (e) a hydraulic accumulator;
    (f) an equalizing reservoir;
    (g) a hydraulic line maintaining a hydraulic connection between said hydraulic machine and said hydraulic accumulator for charging said hydraulic accumulator with hydraulic fluid to a predetermined accumulator pressure and for driving said hydraulic machine from said hydraulic accumulator; said hydraulic line connecting said hydraulic machine with said equalizing reservoir;
    (h) a clutch having an engaged state for drivingly connecting the engine to the hydraulic machine for driving the hydraulic machine from the engine and a disengaged state for disconnecting the engine from the hydraulic machine;
    (i) energy transmitting means for supplying the required driving energy to said subassemblies from at least one of said engine, said hydraulic machine and said hydraulic accumulator;
    (j) regulating means for selectively placing the clutch into the engaged and disengaged state as a function of a prevailing hydraulic pressure in said hydraulic accumulator, the energy requirement of the subassemblies and the braking force represented by a position of the brake pedal;
    (k) a first check valve positioned in said hydraulic line between said hydraulic machine and said equalizing reservoir;
    (l) a second check valve positioned in said hydraulic line between said hydraulic machine and said hydraulic accumulator;
    (m) a first bypass conduit connected to said hydraulic line between said second check valve and said hydraulic machine and between said first check valve and said hydraulic machine for bridging said hydraulic machine;
    (n) a controllable pressure-regulating valve positioned in said first bypass conduit;
    (o) a second bypass conduit connected to said hydraulic line between said second check valve and said hydraulic accumulator and between said first check valve and said hydraulic machine for bridging said second check valve and said hydraulic machine;
    (p) a first switchable stop valve positioned in said second bypass conduit;
    (q) a third bypass conduit connected to said hydraulic line between said second check valve and said hydraulic machine and between said first check valve and said equalizing reservoir for bridging said first check valve and said hydraulic machine; and
    (r) a second switchable stop valve positioned in said third bypass conduit.

* * * * *